(12) United States Patent
Kim et al.

(10) Patent No.: US 8,018,827 B2
(45) Date of Patent: Sep. 13, 2011

(54) SOLID IMMERSION LENS AND FOCUSING LENS, OPTICAL PICKUP DEVICE, AND DATA RECORDING/REPRODUCING APPARATUS USING THE SAME

(75) Inventors: SunMin Kim, Kanagawa (JP); Tsutomu Ishimoto, Tokyo (JP); Takao Kondo, Tokyo (JP); Ariyoshi Nakaoki, Tokyo (JP)

(73) Assignee: Sony Corporation, Tokyo (JP)

( * ) Notice: Subject to any disclaimer, the term of this patent is extended or adjusted under 35 U.S.C. 154(b) by 324 days.

(21) Appl. No.: 12/268,555

(22) Filed: Nov. 11, 2008

(65) Prior Publication Data
US 2009/0135712 A1    May 28, 2009

(30) Foreign Application Priority Data
Nov. 28, 2007  (JP) .................................. 2007-307881

(51) Int. Cl.
*G11B 7/135*    (2006.01)

(52) U.S. Cl. ....................................................... 369/300
(58) Field of Classification Search ................... 369/300
See application file for complete search history.

(56) References Cited

U.S. PATENT DOCUMENTS

| | | | | |
|---|---|---|---|---|
| 7,042,826 B2* | 5/2006 | Matsui | ..................... | 369/112.24 |
| 7,142,365 B2* | 11/2006 | Shinoda | ........................ | 359/618 |
| 7,180,833 B2* | 2/2007 | Takeda et al. | ............... | 369/44.23 |
| 7,230,902 B2* | 6/2007 | Saito et al. | ............... | 369/110.02 |
| 7,558,181 B2* | 7/2009 | Koyama | ..................... | 369/112.24 |
| 7,613,099 B2* | 11/2009 | Shinoda | ................... | 369/112.24 |
| 7,636,292 B2* | 12/2009 | Shinoda et al. | ........... | 369/112.23 |

FOREIGN PATENT DOCUMENTS

| | | |
|---|---|---|
| JP | 2005-302267 A | 10/2005 |
| JP | 2006-228289 A | 8/2006 |

* cited by examiner

*Primary Examiner* — Mark Blouin
(74) *Attorney, Agent, or Firm* — Wolf, Greenfield & Sacks, P.C.

(57) ABSTRACT

A solid immersion lens (SIL) is provided. The SIL includes a spherical part, a cone-shaped part, a tip part, and an edge part between the cone-shaped part and the tip part. The edge part includes a curved surface.

6 Claims, 14 Drawing Sheets

SOLID IMMERSION LENS AND FOCUSING LENS, OPTICAL PICKUP DEVICE, AND DATA RECORDING/REPRODUCING APPARATUS USING THE SAME

CROSS REFERENCES TO RELATED APPLICATIONS

The present invention contains subject matter related to Japanese Patent Application JP 2007-307881 filed in the Japanese Patent Office on Nov. 28, 2007, the entire contents of which being incorporated herein by reference.

BACKGROUND OF THE INVENTION

1. Field of the Invention

The present invention relates to a solid immersion lens (SIL). The present invention also relates to a focusing lens, an optical pickup device, and a data recording/reproducing apparatus, each of which uses the solid immersion lens.

2. Description of the Related Art

Data-recording media, such as those with card and disc shapes, have been widely used as storage media for audio data, video data, other kinds of data, programs, and the like. Systems for recording data on these data-recording media and/or reproducing data therefrom may include an objective lens that faces the surface of the data-recording medium in a noncontact manner. The objective lens reads minute recording marks by detecting a reflectivity change on a phase change material or minute irregularities formed in the recording surface of the data-recording medium or by detecting a magnetic domain with a change in Kerr rotation angle in the case of a magneto-optical recording system. The data-recording media include optical recording media, magneto-optical recording media, and magnetic recording media using a light-assisted magnetic recording system in which the coercivity of a magnetic recording layer is reduced by light irradiation. In this specification, the term "data-recording media" includes such optical recording media, magneto-optical recording media, and magnetic recording media using the light-assisted magnetic recording system.

Such data-recording media have been desired to have larger capacities and higher recording densities. Therefore, a technology for forming a minute light spot corresponding to a smaller recording mark and reading the recording mark with high resolution has been studied.

The size of the light spot on a data-recording medium can be almost equal to the value of "$\lambda/NA_{obj}$", where "$\lambda$" represents the wavelength of applied light and "$NA_{obj}$" represents the numerical aperture of a focusing lens focusing the light onto the data-recording medium. The resolution is also in proportion to this value. The numerical aperture $NA_{obj}$ is represented by the following formula:

$$NA_{obj} = n_A \times \sin\theta$$

where "$n_A$" is a refractive index of a medium, such as air, between a lens and the data-recording medium; "$\theta$" is an incident angle of a peripheral rays through the objective lens; and $NA_{obj}$ is not more than 1(one) when the medium is air, restricting the resolution. It has been attempted to shorten the wavelength of light from a light source, such as a semiconductor laser, and to increase the numerical aperture of a focusing lens in data recoding/reproducing apparatuses.

On the other hand, a near-field optical recording/reproducing method has been proposed in the art as a method for attaining a numerical aperture of more than 1. In other words, the method uses an evanescent wave, or light exhibiting exponential decay with distance from an interface. In the near-field optical recording/reproducing method, a gap between the focusing lens and the data-recording medium may need to be extremely small.

For example, Japanese Unexamined Patent Application Publication No. H5-189796 discloses a technology of irradiating a data-recording medium with near-field light to carry out a near-field recording/reproducing. In the technology, a near-field optical system includes a combination of an objective optical lens and a solid immersion lens (SIL) to carry out a near-field recording/reproducing.

FIGS. 1A, 1B, 2A and 2B illustrate examples of configuration of solid immersion lens typically used in the art, respectively. Each solid immersion lens has a super-hemispherical part and a flat or cone-shaped part facing a data-recording medium when irradiating the data-recording medium with light. FIG. 1A is a schematic cross-sectional view of a D-shaped solid immersion lens (SIL) 92 with a flat part facing an object. FIG. 1B is a schematic cross-sectional view of a focusing lens 94 including a combination of the SIL 92 and an optical lens 93. FIG. 2A is a schematic cross-sectional view of another SIL 102 with a cone-shaped part facing an object. FIG. 2B is a schematic cross-sectional view of a focusing lens 104 including a combination of the SIL 102 and an optical lens 103. FIGS. 1A, 1B, 2A and 2B show that each of the SILs 92 and 102 faces the surface of an object irradiated with light, such as a data-recording medium 111, with a small gap therebetween and that the surface of the data-recording medium 111 is being irradiated with incident light "Li". It is noted that the optical properties of the D-shaped SIL 92 shown in FIGS. 1A and 1B are principally the same as those of the cone-shaped SIL 102 shown in FIGS. 2A and 2B, because only the shapes of the portions off the optical path of incident light are different from each other.

The spherical part of SIL is not limited to having a super-hemispherical shape. Alternatively, it may be hemispherical. If the radius of the spherical part is "r" and the refractive index of the material of the lens is "n", then the thickness of the spherical part is "r" in the direction of the optical axis in the case of the spherical part in a hemispherical shape or "r+r/n" in the case of the spherical part in a super-hemispherical shape.

If a focusing lens is formed of a two-group lens, a combination of an optical lens and a SIL, as described in Japanese Unexamined Patent Application Publication No. H5-189796, the effective numerical aperture "NA" of the near-field optical system of the combination of lenses can be represented by the following equation (1) in the case of a hemispherical SIL:

$$NA = n_{SIL} \times \sin\theta i \tag{1}$$

or the following equation (2) in the case of a super-hemispherical SIL:

$$NA = n_{SIL}^2 \times \sin\theta i \tag{2}$$

In these equations, "$\theta i$" is an incident angle of light "Li"; and "$n_{SIL}$" is a refractive index of the material of the SIL.

The above equations (1) and (2) show that an increase in refractive index of the material of the SIL, which is considered to be a medium between an objective lens and a data-recording medium, can lead to an increase in numerical aperture "NA". In particular, an effective numerical aperture "NA" for the super-hemispherical SIL is higher than that for the hemispherical SIL when they have the same refractive index.

SUMMARY OF THE INVENTION

For irradiating an object with evanescent light in the near-field state as described above, the gap between the surface of SIL facing the object and the surface of the object, such as the surface (recording surface) of a data-recording medium, may need to be about ½ to ⅕ of the wavelength of irradiation light. In other words, when using short-wavelength light to increase recording density, the desired gap may be small as about 20 nm to 30 nm. In order to avoid the collision of a tip part of the SIL and the data-recording medium, the surface of SIL facing an object and the surface of the object such as the data-recording medium may need to be kept in parallel while maintaining the minute gap between them.

FIGS. 3 and 4 schematically illustrate allowable inclinations or allowable skews of the respective SILs with different shapes. FIG. 3 illustrates a state in which the D-shaped SIL 92 as illustrated in FIGS. 1A and 1B obliquely faces the data-recording medium 111. FIG. 4 illustrates a state in which the SIL 102 with a cone-shaped part facing the object as illustrated in FIGS. 2A and 2B obliquely faces the data-recording medium 111.

If the gap between the surface of SIL facing the object and the data-recording medium is "g" and the diameter of the surface is "D", then the allowable skew can be represented by "2×g/D". As shown in FIG. 3, the D-shaped SIL 92 has an allowable skew of +/−0.003 degrees when the diameter D1 is 1 mm and the gap (g) is 25 nm, which may be extremely strict degrees of the allowable skew and skew margin.

On the other hand, as shown in FIG. 4, the SIL 102 with a cone-shaped part facing the object has an allowable skew of +/−0.07 degrees when the diameter D2 of the tip part facing the object is 40 μm and the gap (g) is 25 nm. Accordingly, the SIL 102 with the cone-shaped part facing the object may have a comparatively wide allowable range of inclination and have an advantageous effect of improving the stability of a system such as an optical pickup system using the SIL 102. Therefore, SILs with a cone-shaped part facing the object as shown in FIGS. 2 and 4 have been typically used in a near-field optical recording system.

FIG. 5A is a schematic perspective view of SIL with a cone-shaped part facing the object as described above and a tip part having a flat surface facing the object. FIG. 5B is a photograph of a cone-shaped SIL which has been actually formed. FIG. 5C schematically illustrates a radial cross-sectional view of the SIL with its centerline, or an optical axis C. FIG. 5D illustrates an enlarged cross-sectional view of a tip part surrounded by a dashed line in FIG. 5C. As shown in FIG. 5D, in the cross-section including the optical axis C, a cone-shaped part 102C is inclined at about 20 degrees from the flat surface of the tip part, in other words, from a surface a1 extended from a surface 102S facing the object. In this case, an edge part 102E, the edge of the surface 102S facing the object may be a comparatively keen edge part in collision. In other words, the SIL with a cone-shaped part facing the object may have a comparatively keen edge part circumferentially formed on the boundary between the cone-shaped part and the flat surface of the tip part.

If such keen edge part collides with the surface of a data-recording medium and they are brought into contact with each other, a large stress may concentrate on the surface of the data-recording medium to cause an intense damage. FIG. 6 is a photographic view of an example of a damage caused on the surface of a data-recording medium, when using the SIL with a tip shaped as shown in FIG. 5D, by collision while the SIL facing the surface of the rotating data-recording medium. If such damage has been caused, the data-recording medium may be unusable. It is difficult to completely avoid the collision and therefore it is desirable that damage to a data-recording medium can be suppressed even when the collision occurs.

It is desirable to provide a solid immersion lens (SIL) that can suppress damage caused to an object irradiated with light such as a data-recording medium, even when the SIL collides with the object. It is also desirable to provide a focusing lens, an optical pickup device, a data recording/reproducing apparatus, each of which uses such a SIL.

According to an embodiment of the present invention, there is provided a solid immersion lens (SIL) including a spherical part, a cone-shaped part, a tip part, and an edge part between the cone-shaped part and the tip part, where the edge part includes a curved surface.

According to another embodiment of the present invention, there is provided a focusing lens including a SIL and an optical lens arranged on the opposite side of the SIL facing an object. The SIL includes a spherical part, a cone-shaped part, a tip part, and an edge part between the cone-shaped part and the tip part, where the edge part includes a curved surface.

According to further embodiment of the present invention, there is provided an optical pickup device including a SIL, an optical lens arranged on the opposite side of the SIL facing an object, and a light source. The SIL and the optical lens constitute a focusing lens by which light emitted from the light source is focused to form a light spot. The SIL includes a spherical part, a cone-shaped part, a tip part, and an edge part between the cone-shaped part and the tip part, where the edge part includes a curved surface.

According to further another embodiment of the present invention, there is provided a data recording/reproducing apparatus including an optical pickup device and a control device. The optical pickup device includes a SIL, an optical lens arranged on the opposite side of the SIL facing a data-recording medium, and a light source. The SIL and the optical lens constitute a focusing lens by which light emitted from the light source is focused to form a light spot. The control device is configured to control the focusing lens to move in at least one of a gap direction and a tracking direction of the data-recording medium. The SIL includes a spherical part, a cone-shaped part, a tip part, and an edge part between the cone-shaped part and the tip part, where the edge part includes a curved surface.

As described above, the SIL according to the embodiments of the present invention includes the spherical part, the cone-shaped part, the tip part, and the edge part between the cone-shaped part and the tip part. The edge part includes a curved surface. The curved surface is provided to at least a portion of the edge part between the cone-shaped part and the tip part having a surface facing an object. Thus, when allowing the SIL to face the object with a minute gap of about 20 nm to 50 nm and move relative to the object such as a data-recording medium irradiated with light, damage to the object can be suppressed even if the SIL collides with the object.

Consequently, according to the embodiments of the SIL and the focusing lens, the optical pickup device, and the data-recording/reproducing apparatus using such SIL, the SIL includes the spherical part, the cone-shaped part, the tip part, and the edge part between the cone-shaped part and the tip part. The edge part includes the curved surface. Therefore, damage to an object such as a data-recording medium irradiated with light can be suppressed even if the SIL collides with the object.

BRIEF DESCRIPTION OF THE DRAWINGS

according to the related art, where FIG. 1A is a cross-sectional view of the SIL and FIG. 1B is a cross-sectional view of a focusing lens.

FIG. 2A is a cross-sectional view of the SIL and FIG. 2B is a cross-sectional view of a focusing lens.

FIG. 5A is a perspective view of the SIL according to the related art, FIG. 5B is a photograph thereof, FIG. 5C is a schematic cross-sectional view thereof, and FIG. 5D is an enlarged cross-sectional view of a main part thereof.

FIG. 7A is a schematic cross-sectional view of the focusing lens, FIG. 7B is a schematic cross-sectional view of an example of the SIL, and FIG. 7C is a schematic cross-sectional view of another example of the SIL.

FIG. 16A is a photographic view of a tip part of SIL, FIG. 16B is a photographic view of damage to a data-recording medium caused by collision, and FIG. 16C is a graph showing variations in output of gap-error signals.

FIG. 17A is a photographic view of the tip part of the SIL, FIG. 17B is a photographic view of damage to a data-recording medium caused by collision, and FIG. 17C is a graph of variations in output of gap-error signals.

DESCRIPTION OF THE PREFERRED EMBODIMENTS

Hereinafter, the preferred embodiments for carrying out the present invention will be described with reference to the attached drawings. However, the present invention will not be limited to the following description.

Figure 1A:
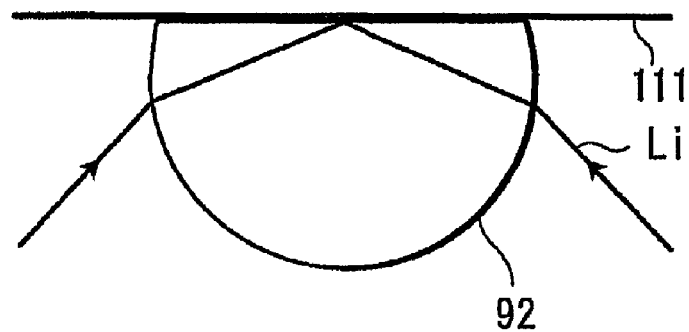
FIGS. 1A and 1B are schematic cross-sectional views illustrating the configuration of a solid-immersion lens (SIL)
Figure 1B:
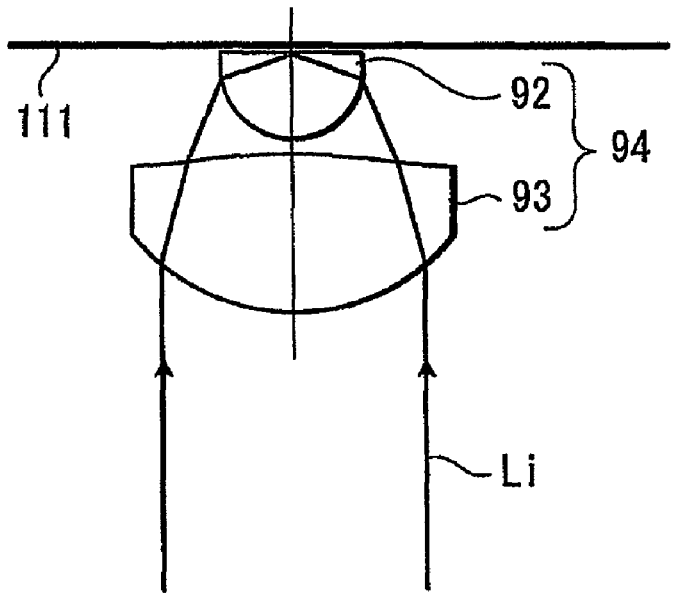
Figure 2A:
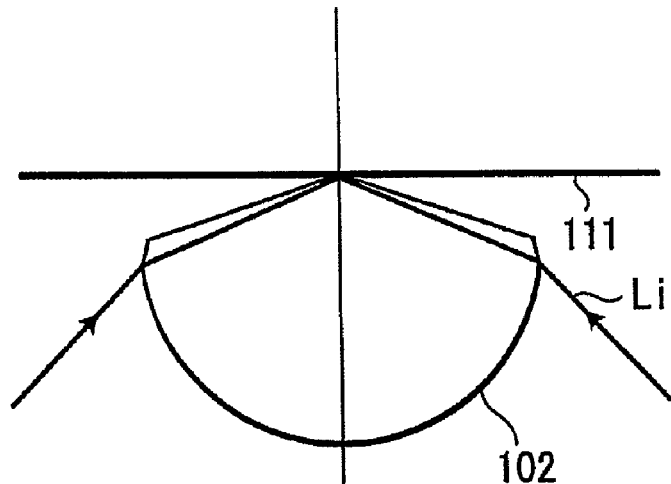
FIGS. 2A and 2B are schematic cross-sectional views illustrating the configuration of a SIL according to the related art, where
Figure 2B:
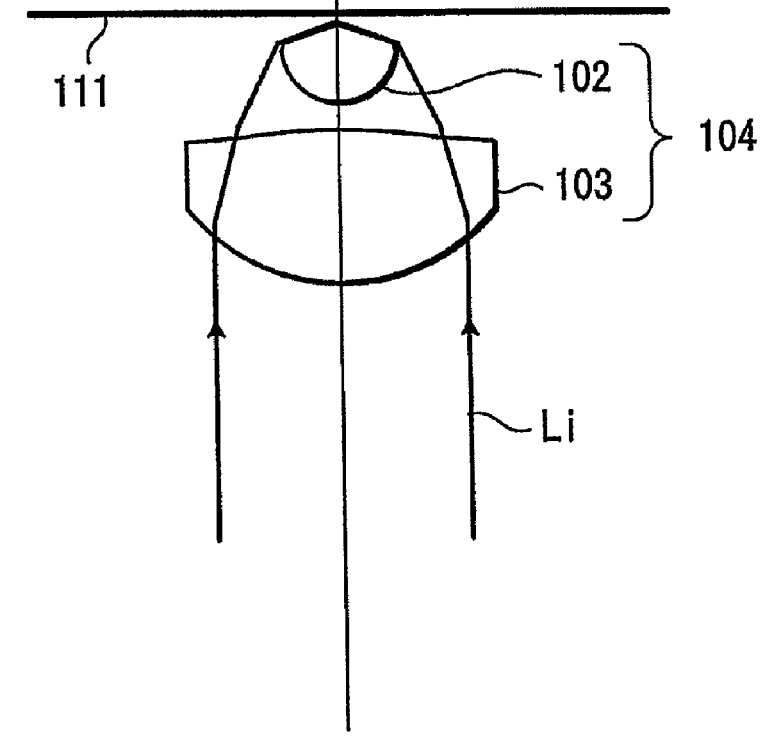
Figure 3:
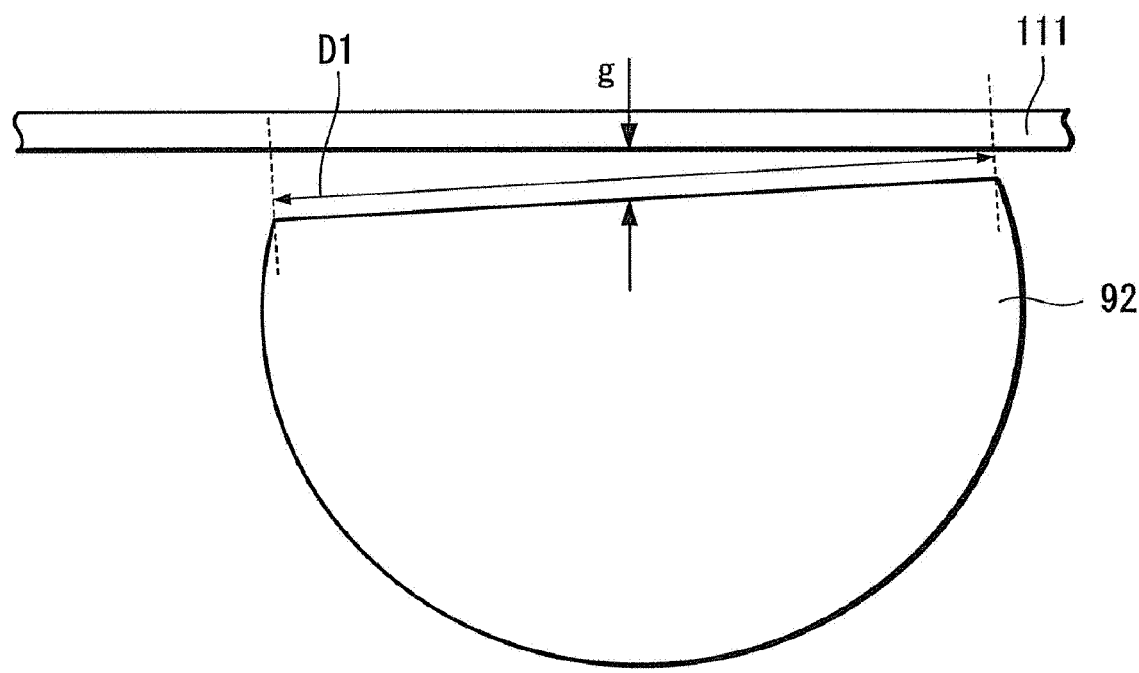
FIG. 3 is a schematic cross-sectional view illustrating an allowable inclination of a SIL according to the related art with respect to a data-recording medium.
Figure 4:
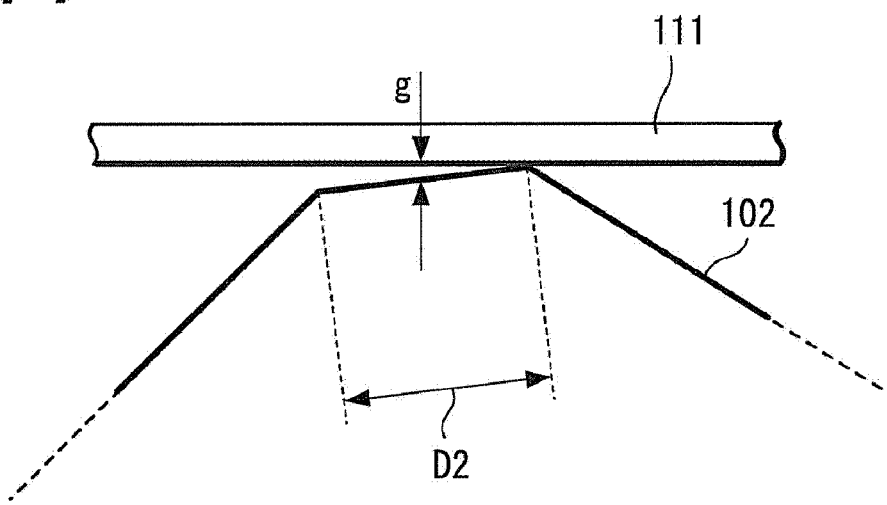
FIG. 4 is a schematic cross-sectional view illustrating the allowable inclination of a SIL according to the related art with respect to a data-recording medium.
Figure 5A:
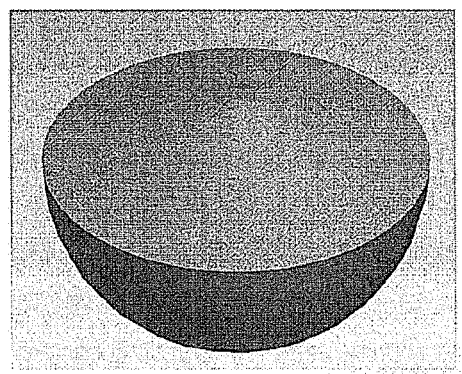
FIGS. 5A through 5D are views illustrating the configuration of a SIL according to the related art, where
Figure 5B:
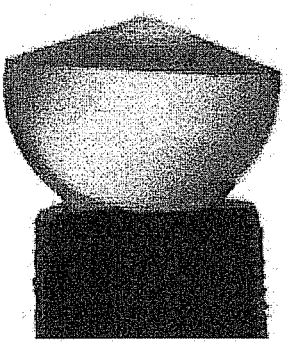
Figure 5C:
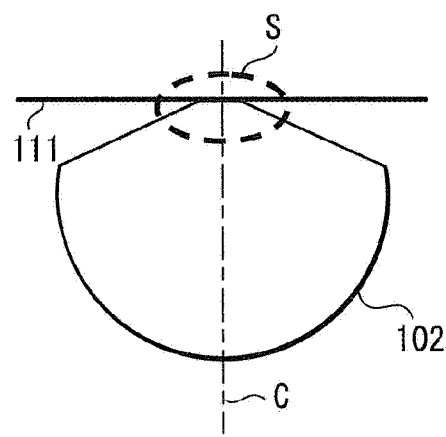
Figure 5D:
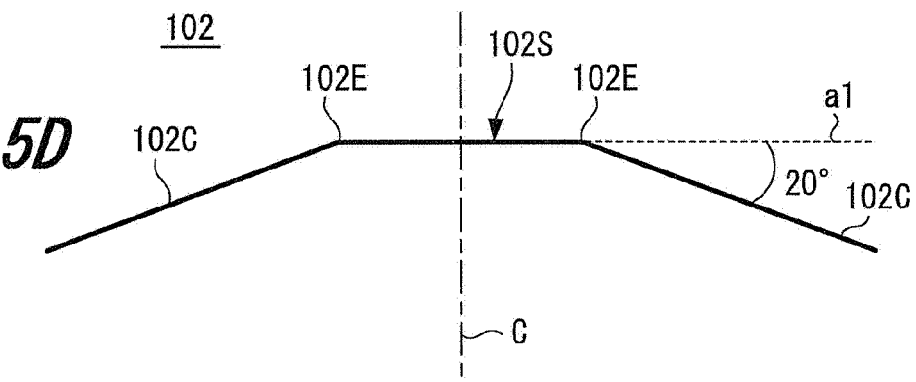
Figure 6:
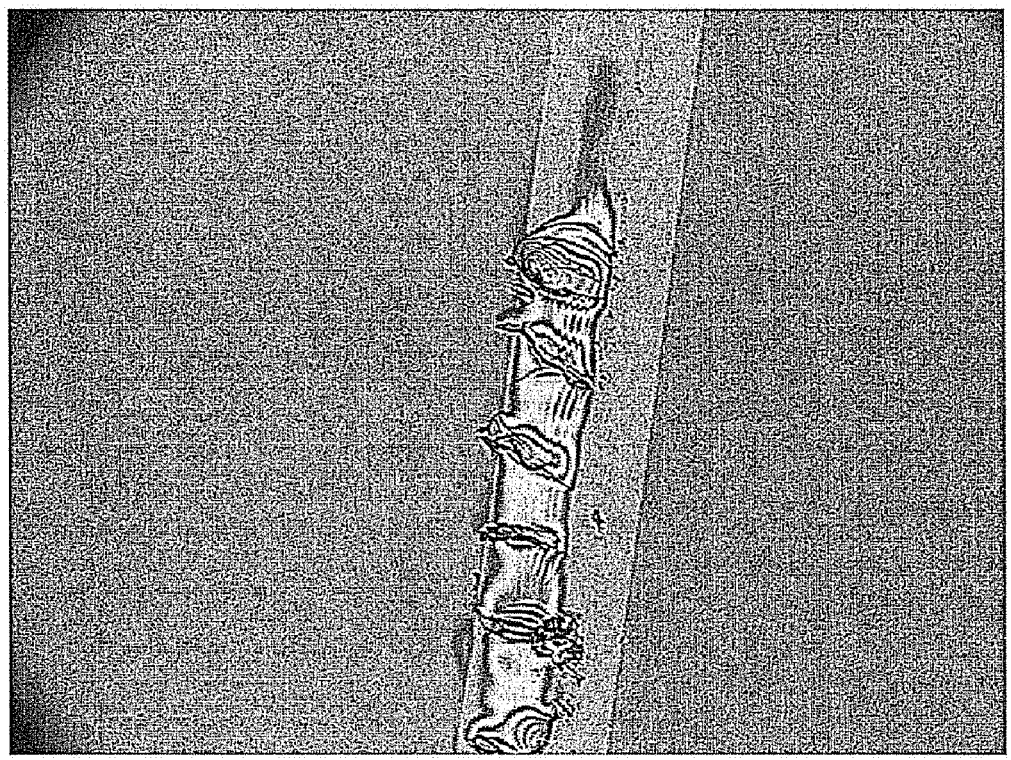
FIG. 6 is a photographic representation showing damage to a data-recording medium caused by collision with a SIL according to the related art.
Figure 7A:
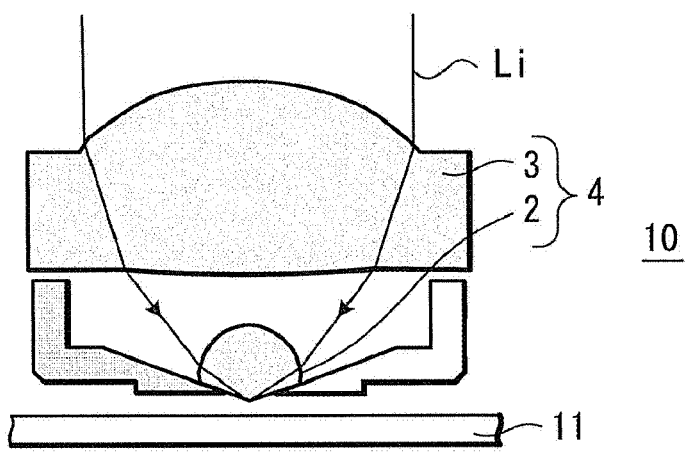
FIGS. 7A to 7C are cross-sectional views illustrating the configuration of a focusing lens and an solid immersion lens (SIL) included therein according to an embodiment of the present invention, where
Figure 7B:
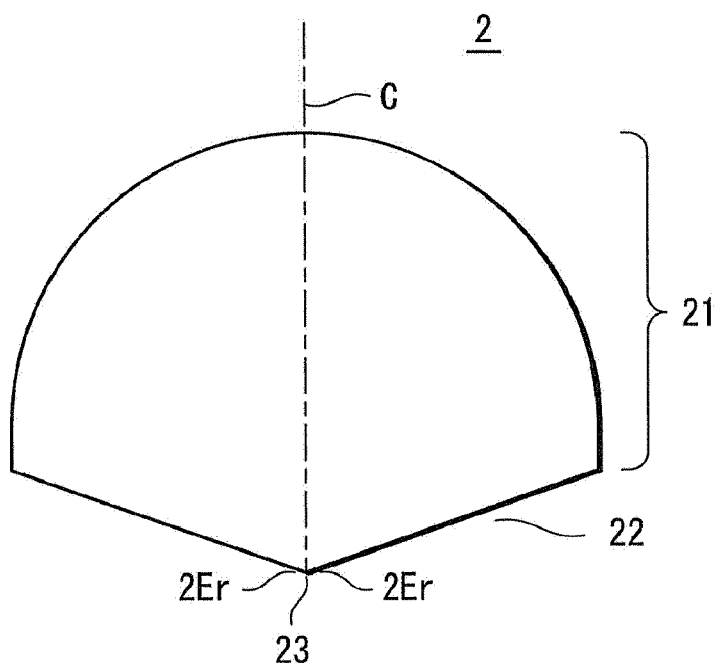
Figure 7C:
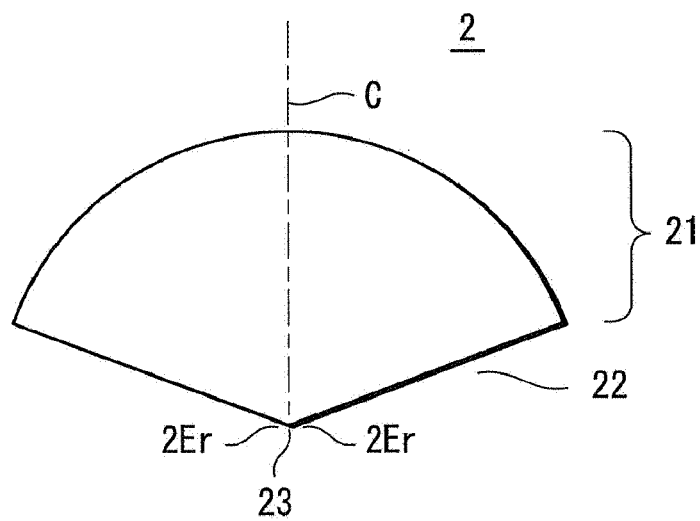

FIG. 7A is a schematic diagram illustrating the configuration of an optical pickup device 10 according to an embodiment of the present invention. The optical pickup device 10 includes a focusing lens 4. The focusing lens 4 is formed of: a solid immersion lens (SIL) 2 in accordance with an embodiment of the present invention as described later; and an optical lens 3, such as an aspheric lens on the opposite side of the SIL 2 facing an object. The SIL 2 and the optical lens 3 are coaxially arranged so that their optical axes can be substantially aligned with each other. As shown in the figure, the optical pickup device 10 faces a data-recording medium 11 irradiated with near-field light. According to the embodiment of the present invention, as shown in FIGS. 7B and 7C, the SIL 2 includes a spherical part 21, a cone-shaped part 22, and a tip part 23. In addition, a curved surface is formed on an edge part between the cone-shaped part 22 and the tip part 23. An example of the spherical part 21 shown in FIG. 7B is in the shape of a super-hemisphere, while another example thereof shown in FIG. 7C is in the shape of a hemisphere.

A suitable material of the SIL 2 may be, for example, one having a high refractive index, a high transmittance, and a small light absorption for the wavelength of incident light from a laser light source mounted on a data recording/reproducing apparatus. For example, suitable materials include: S-LAH79 (trade name) manufactured by OHARA Inc., glass with high refractive index; ceramics with high refractive index; and monocrystal materials, such as $Bi_4Ge_3O_{12}$, $SrTiO_3$, $KTaO_3$, $ZrO_2$, $HfO_2$, SiC, diamonds, and GaP.

Figure 8:
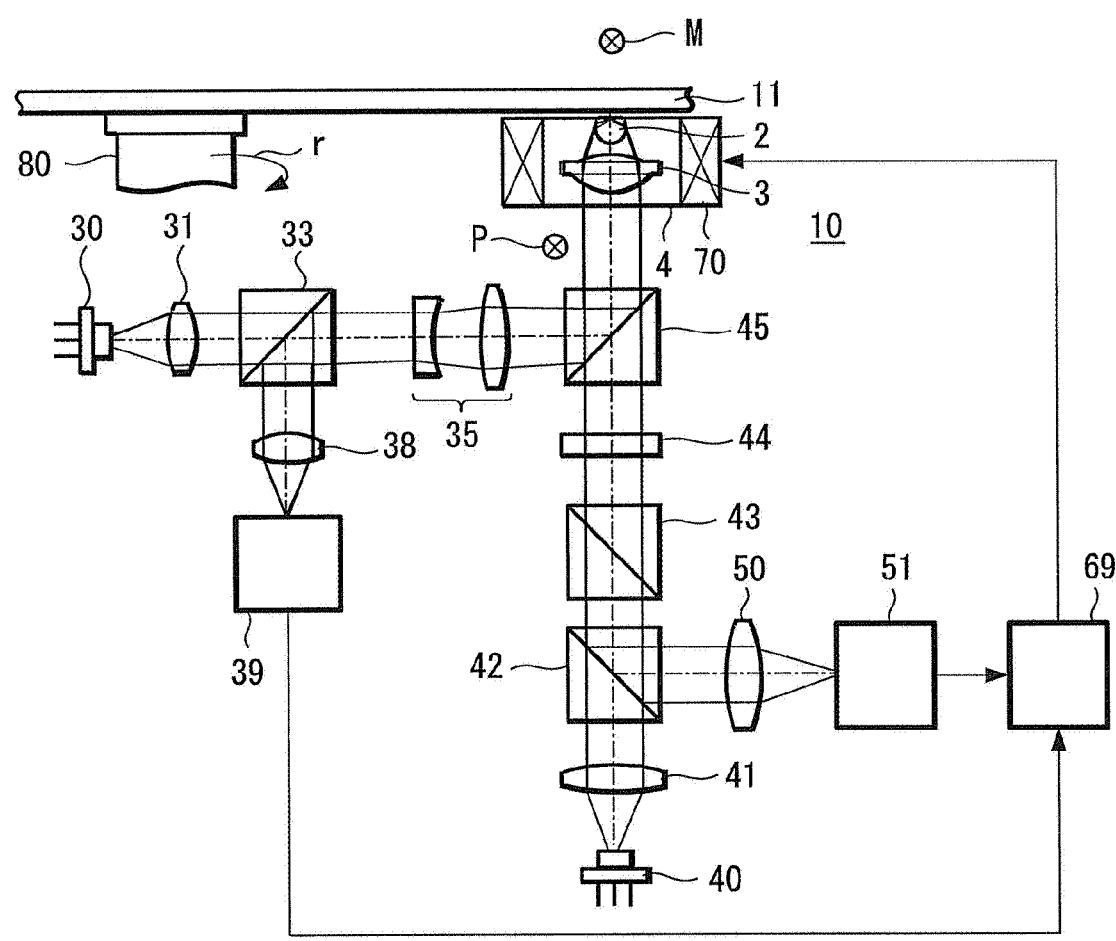
FIG. 8 is a block diagram schematically illustrating the configuration of a data recording/reproducing apparatus according to an embodiment of the present invention.

FIG. 8 is a schematic diagram illustrating the configuration of a data recording/reproducing apparatus 100 in accordance with an embodiment of the present invention. In this embodiment, an example using two kinds of light with different wavelengths is described. Specifically, the data recording/reproducing apparatus 100 uses light beams for at least recording or reproduction (hereinafter, also referred to as those for recording/reproduction) and the other light beams for gap-detection. In this embodiment, as shown in FIG. 8, there are two light sources 30 and 40.

On the path of light output from the light source 30, a collimating lens 31, a polarization beam splitter 33, a beam expander 35, and a dichroic prism 45 are arranged. The dichroic prism 45 is designed to reflect light from the light source 30. A focusing lens 4 including a SIL 2 and an optical lens 3 is arranged on the path of light reflected from the dichroic prism 45. A light-detecting part 39, such as a photodiode, is arranged on a return light path for the light reflected from the polarization beam splitter 33 via a lens 38.

On the path of light output from the other light source 40, a collimating lens 41, a beam splitter 42, a polarization beam splitter 43, a ¼-wavelength plate 44, and the dichroic prism 45 are arranged. The focusing lens 4 is arranged on the path of light transmitted through the dichroic prism 45. A light-detecting part 51, such as a photodiode, is arranged on a return light path for the light reflected from the beam splitter 42 via a lens 50.

As shown in FIG. 8, a data-recording medium 11 is mounted on the data recording/reproducing apparatus 100 and can be rotated in the direction of the arrow "r" by a driving part 80, such as a spindle motor. In FIG. 8, the arrow "M" indicates the moving direction of the data-recording medium 1 relative to the SIL 2.

In the configuration of the data recording/reproducing apparatus 100 as described above, recording/reproduction light emitted from the light source 30 is converted into collimated light beams by the collimating lens 31. The collimated light beams pass through the polarization beam splitter 33 and the beam width thereof is then adjusted by the beam expander 35. Subsequently, the beams are reflected by the dichroic prism 45 and then incident on the focusing lens 4 (i.e., the optical lens 3 and the SIL 2) mounted on a control mechanism 70, such as a biaxial actuator. The return light reflected from the recording surface of the data-recording medium 11 is reflected by the dichroic prism 45 via the SIL 2 and the optical lens 3 and then reflected by the polarization beam splitter 33 via the beam expander 35. Subsequently, the light is focused on the light-detecting part 39 by the lens 38.

A RF-reproduction signal, a tracking signal, and the like are obtained from the light incident at the light-detecting part 39. Such signals are then transmitted to a control device 69 where a tracking control signal is generated in response to the input signal, followed by driving the control mechanism 70, such as the biaxial actuator, on which the focusing lens 4 is held in place.

On the other hand, the light source 40 emits light toward the dichroic prism 45 through the collimating lens 41, the beam splitter 42, the polarization beam splitter 43, and the ¼-wavelength plate 44. The dichroic prism 45 combines the light from the light source 40 with the light from the light source 30 and then allows the light to be applied as a gap-detecting beam spot on the data-recording medium 11 via the optical lens 3 and the SIL 2. Return light of the beam spot reflected on the data-recording medium 11 passes through the dichroic prism 45 and the ¼ wavelength plate 44, followed by reaching the polarization beam splitter 43. Light leaked from the polarization beam splitter 43 is reflected on the beam splitter 42 and then detected by the light-detecting part 51 via the lens 50.

If the gap between the data-recording medium 11 and the SIL 2 is large and the total reflection of light substantially occurs on the end face of the SIL 2, the polarization of light changes on the surface of the SIL 2. Thus, part of the light is leaked from the polarization beam splitter 43 on the return light path. On the contrary, if the gap between the data-recording medium 11 and the SIL 2 is small and near-field light is leaked and reflected almost normally, a change in polarization of light is small. Thus, the amount of light leaked from the polarization beam splitter 43 is small. Therefore, the gap detection can be carried out using such a difference in amount of total reflection return light, or a change in amount of light.

A method of detecting the gap between the SIL 2 and the data-recording medium 11 may be any of various methods known in the art, such as a method of detecting a change in electrostatic capacitance.

Figure 9:
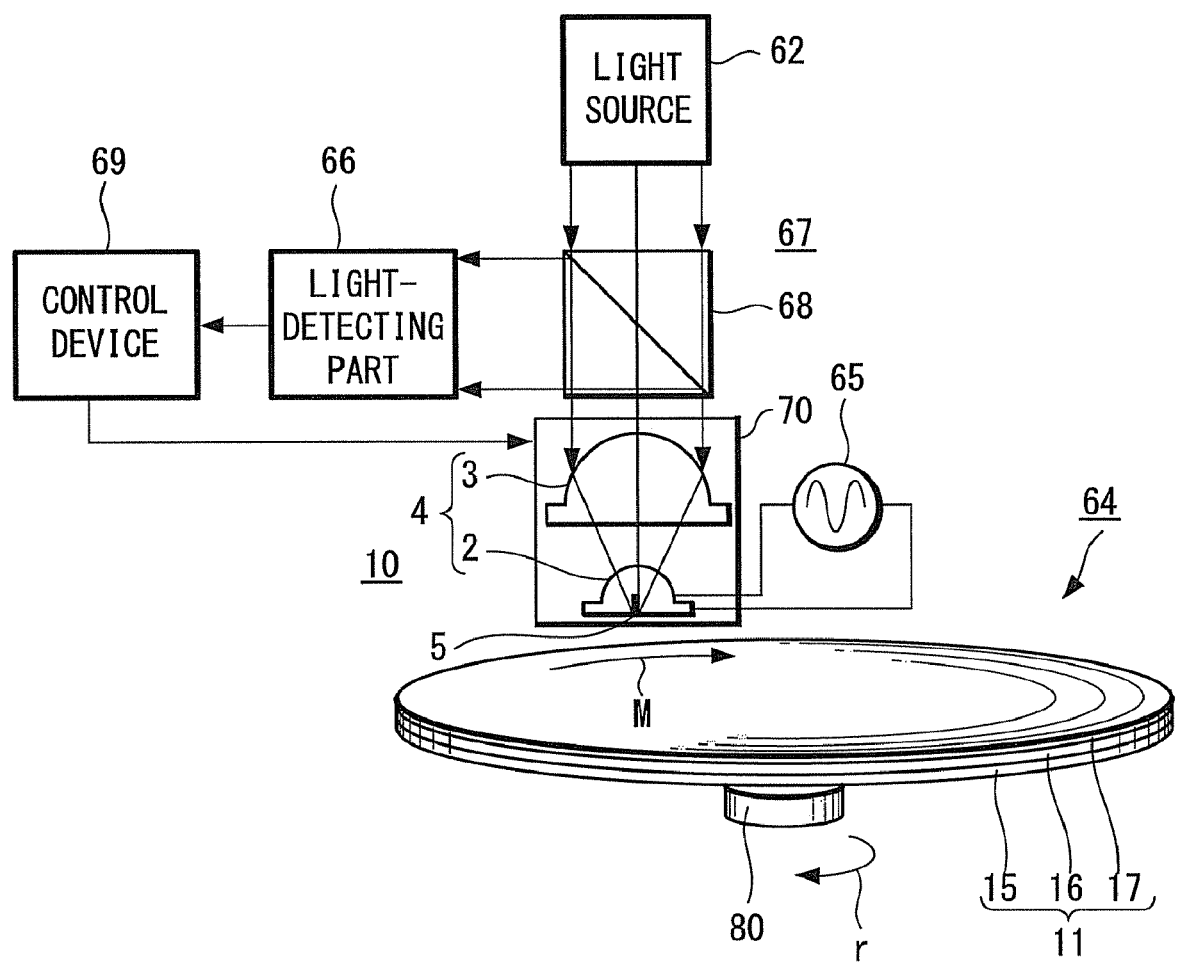
FIG. 9 is a block diagram schematically illustrating the configuration of a data recording/reproducing apparatus according to an embodiment of the present invention.

FIG. 9 is a schematic diagram illustrating the configuration of a data recording/reproducing apparatus in accordance with another embodiment of the present invention. The data recording/reproducing apparatus 100 carries out magnetic recording using a light-assisted magnetic recording system. The apparatus 100 includes a light source 62 and an optical pickup device 10. The light source 62 may be, for example, a semiconductor laser device that emits a laser beam at a wavelength of 405 nm. The optical pickup device 10 includes a focusing lens 4 formed of a SIL 2 according to an embodiment of the present invention and an optical lens 3. Furthermore, the data recording/reproducing apparatus 100 includes a mounting part 64 on which a data-recording medium 11 is mounted and rotated. Here, the data-recording medium 11 is a magnetic disc on which the light-assisted magnetic recording is carried out. The data recording/reproducing apparatus 100 also includes a recording-signal supply circuit 65 supplying recording signals to a magnetic head coil of a magnetic head device 5 in the optical pickup device 10. The magnetic head device 5 may be a thin-film magnetic head having a magnetic head coil, a main magnetic pole, and the like, which are arranged in the vicinity of the tip of the SIL 2. Furthermore, an optical system 67 is provided in the data recording/reproducing apparatus 100. The optical system 67 is provided for introducing a laser beam from the light source 62 into the optical pickup device 10 and introducing return light from the data-recording medium 11 into a light-detecting part 66 with a photodiode or the like. Here, for example, the data-recording medium 11 may have a soft-magnetic layer 16 and a recording layer 17 which are stacked in this order on a substrate 15 made of glass or the like.

The optical system 67 may have a collimating lens (not shown), a beam splitter 68, and the like, for example, in the same manner as that illustrated in FIG. 8 as described above. In addition, the data recording/reproducing apparatus 100 also includes a positioning control device 69. Here, in the control device 69, a detection output supplied from the light-detecting part 66 is computed to obtain a desired servo signal transmitted to the optical pickup device 10, such as servo signals for gap-control, tracking, and the like. Then, the control device 69 controls the optical pickup device 10 by supplying these signals. Furthermore, if the optical pickup device 10 has a reproducing magnetic head, such as a thin-film magnetic reproducing head mounted in addition to the thin-film magnetic recording head, such a head device (not shown) may be connected to a reproduction-signal circuit to carry out an operation of reproducing magnetic signals.

The mounting part 64 may be rotated with the data-recording medium 11 such as a magnetic disc mounted thereon in the direction indicated by the arrow "r" by a driving part 80 such as a spindle motor. Thus, the data-recording medium 11 is allowed to rotate in the direction indicated by the arrow "M". A control mechanism 70 driven by the control device 69 can be formed of, for example, an air bearing slider as described later with reference to FIG. 10 or a biaxial actuator. The control mechanism 70 is provided with the optical pickup device 10 having the focusing lens 4. The control mechanism 70 can be driven in response to a tracking servo signal and a gap serve signal to adjust the movement of the focusing lens 4 in the tracking direction or in the optical axial direction (i.e., the gap direction).

In the data recording/reproducing apparatus 100 as illustrated in FIG. 9, the data-recording medium 11 is in the shape of a disc and rotated around the axis of the driving part 80. The light source 62 emits a laser beam at a desired wavelength, for example, a wavelength of 400 nm. The laser beam travels along the optical axis of the optical pickup device 10 and is then introduced into the device 10 via the optical system 67. The optical lens 3 and the SIL 2 of the focusing lens 4 in the optical pickup device 10 are used to generate near-field light with a desired minute spot diameter. Subsequently, the data-recording medium 11 is illuminated with the near-field light. The minute light spot is applied to the medium 11 being rotated, and a data-recording signal is supplied to the magnetic head coil of the magnetic head device 5. As a result, the recording signal magnetic field is applied to the data-recording medium 11 from the tip of the main magnetic pole (not shown) of the magnetic head device 5, thereby recording the signal thereon.

In accordance with the embodiment of the present invention, as illustrated in FIG. 8, the data recording/reproducing apparatus 100 may be designed as an active control type in which the optical pickup device 10 carries out gap-control and tracking operations by controlling the biaxial actuator or the like. Alternatively, it may be designed as a passive control type in which the gap-control and tracking operations can be carried out by air bearing through the movement or rotation of the data-recording medium 11.

Figure 10:
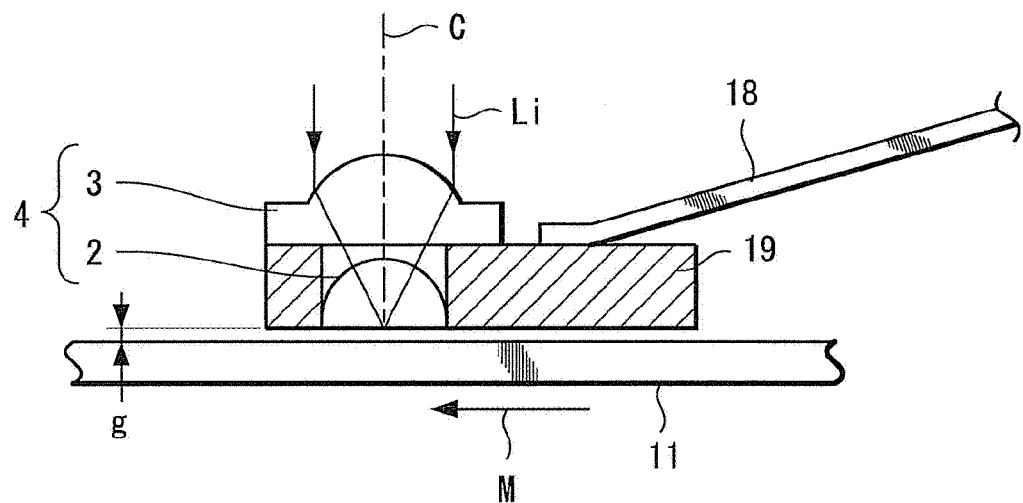
FIG. 10 is a schematic cross-sectional view illustrating the configuration of a data recording/reproducing apparatus according to an embodiment of the present invention.

FIG. 10 is a partial cross-sectional side view of the optical pickup device 10 in accordance with an embodiment of the present invention. In the optical pickup device 10, the control mechanism 70 for tracking and gap control is designed as an air-bearing slider. In FIG. 10, portions corresponding to those in FIG. 9 are denoted by the same reference numerals, and thus detailed description thereof will be omitted. The air bearing-type control mechanism includes a slider 19 supported by a free end of a suspension 18 and the optical pickup device 10 is mounted on the slider 19. In this embodiment, for example, the slider 19 can be lifted when a data-recording medium 11 facing the magnetic head device 5 on the SIL 2 moves or rotates in the direction indicated by the arrow "M". The floating height of the slider 19 adjusts the gap between the optical pickup device 10 and the data-recording medium 11 to be a predetermined minute gap.

A SIL according to an embodiment of the present invention, the focusing lens and the optical pickup device including such SIL are used in the data recording/reproducing apparatuses. Therefore, damage to a data-recording medium can be suppressed even if the SIL collides with the data-recording medium. The data recording/reproducing apparatus according to an embodiment of the present invention is not limited to those described above. For example, the laser light sources with different wavelengths are used in the example illustrated in FIG. 8. Alternatively, a single light source may be used to carry out recording/reproduction and gap-control operations.

Next, SILs in accordance with respective embodiments of the present invention will be described.

(1) First Embodiment

Figure 11:
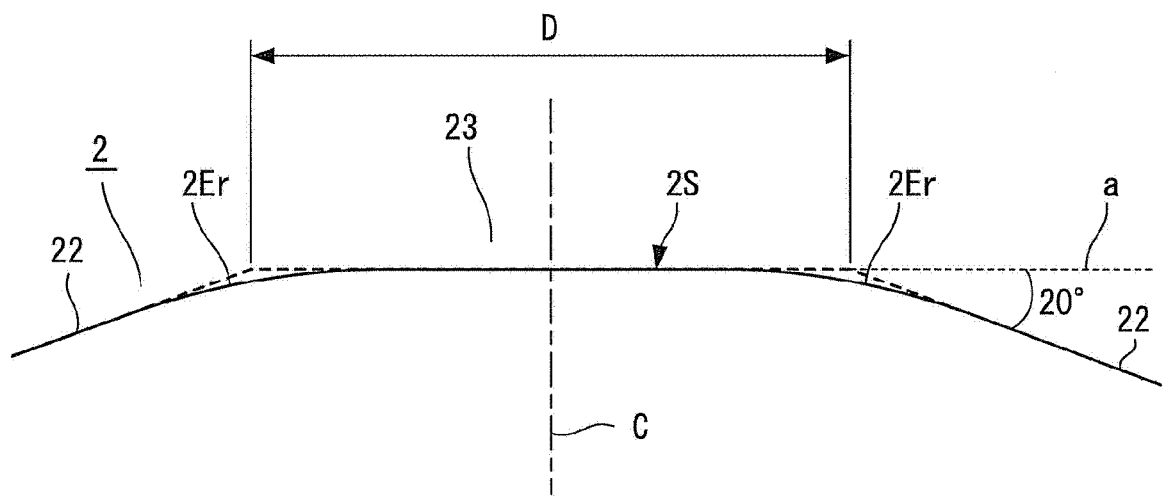
FIG. 11 is an enlarged cross-sectional view of a main part of SIL according to an embodiment of the present invention.

FIG. 11 is an enlarged schematic view illustrating a tip part 23 and a cone-shaped part 22 of a SIL 2 in accordance with a first embodiment of the present invention. In this embodiment, although not shown in the figure, a spherical part is super-hemispherical or hemispherical as illustrated in FIG. 7B or 7C. The thickness of the spherical part in the optical axis direction can be represented by "r" for a hemispherical shape and "r+r/n" for a super-hemispherical shape where "r" represents the radius of the spherical part and "n" represents the refractive index of the material of the SIL 2.

In this embodiment, the tip part 23 has a flat surface 2S, and an edge part between the cone-shaped part 22 and the tip part 23 has a curved surface 2Er. As shown in FIG. 11, the SIL 2 of the embodiment includes the curved surface 2Er formed on the whole area of the edge part such that it extends circumferentially around the optical axis represented by the dashed line "C".

In FIG. 11, the broken line represents the shape of an edge part according to the related art. The curved surface 2Er may constitute a part of the spherical surface in the cross section including the optical axis C. In FIG. 11, the broken line "a" represents the surface extended from the flat surface 2S of the tip part 23 and "θ" represents an angle formed by the broken line "a" and the cone-shaped part 22. If the flat surface 2S has a diameter (D) of 40 μm and an angle (θ) of 20 degrees, for example, the curved surface 2Er of the edge part may have a curvature of 50 μm. The diameter (D) of the flat surface 2S, the angle (θ), and the curvature of the curved surface 2Er are not limited to those values.

In this way, the SIL 2 in which the curved surface 2Er with a suitable curvature is formed on the circumference of the flat surface 2S is used in the optical pickup device. Therefore, damage to a data-recording medium 11 (e.g., an optical disc, a magneto-optical disc, or a magnetic disc) and the SIL 2 can be prevented or reduced even when the data-recording medium 11 and the SIL 2 collide with each other.

(2) Second Embodiment

Figure 12:
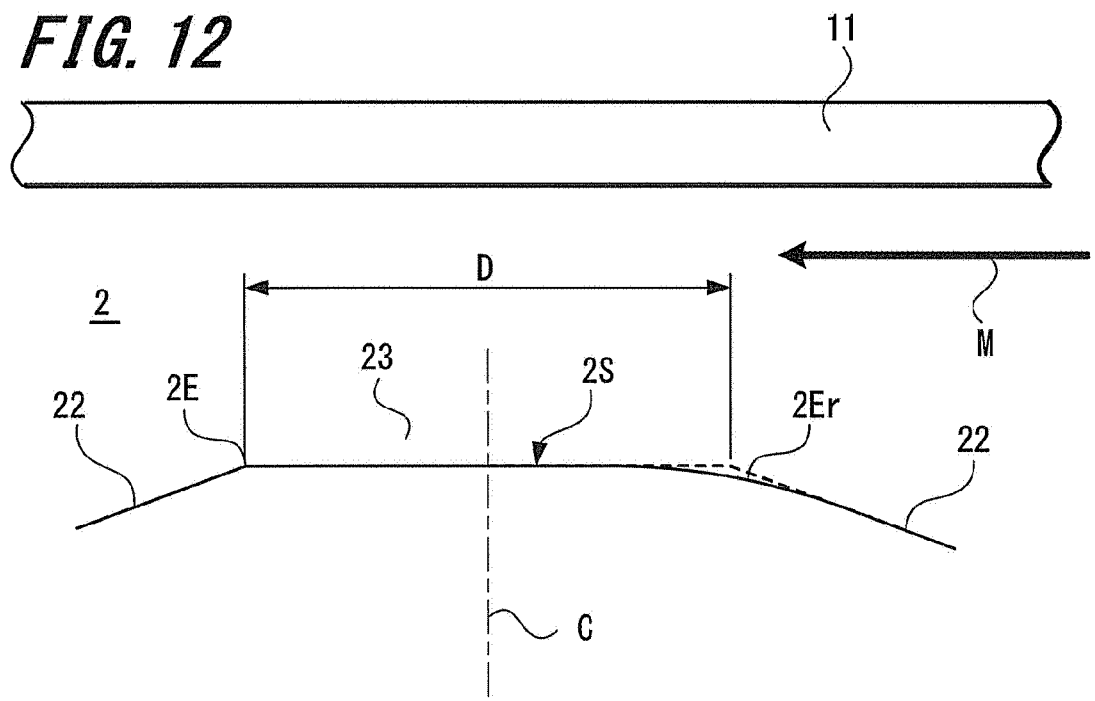
FIG. 12 is an enlarged cross-sectional view of a main part of SIL according to an embodiment of the present invention.

FIG. 12 is an enlarged schematic view illustrating a tip part 23 and a cone-shaped part 22 of a SIL 2 in accordance with a second embodiment of the present invention. In this embodiment, the tip part 23 has a flat surface 2S and a portion of an edge part between the cone-shaped part 22 and the tip part 23 has a curved surface 2Er. As shown in FIG. 12, the broken line represents the shape of an edge part according to the related art. In the illustrated example, the arrow "M" represents the moving direction of a data-recording medium 11 facing the SIL 2. In other words, the curved surface 2Er is formed in an area where the data-recording medium 11 comes close to the edge part. Other portions of the edge part may have no curved surface and allow the flat surface 2S to form a predetermined angle with the cone-shaped part 22. Alternatively, a curved surface with a comparatively small curvature may be formed on the remaining portion of the edge part. If the collision occurs during the movement (i.e., rotation or the like) of the data-recording medium 11 relative to the SIL 2, the portion of the edge part of the SIL 2 in the area where the medium 11 comes close to may cause a significant damage to the medium 11. Thus, the formation of the curved surface 2Er with a comparatively large curvature on the portion of the edge part in such an area can ease the stress concentration on the collided portion. As a result, the surface of the data-recording medium may be prevented from receiving a substantial damage.

Figure 13:
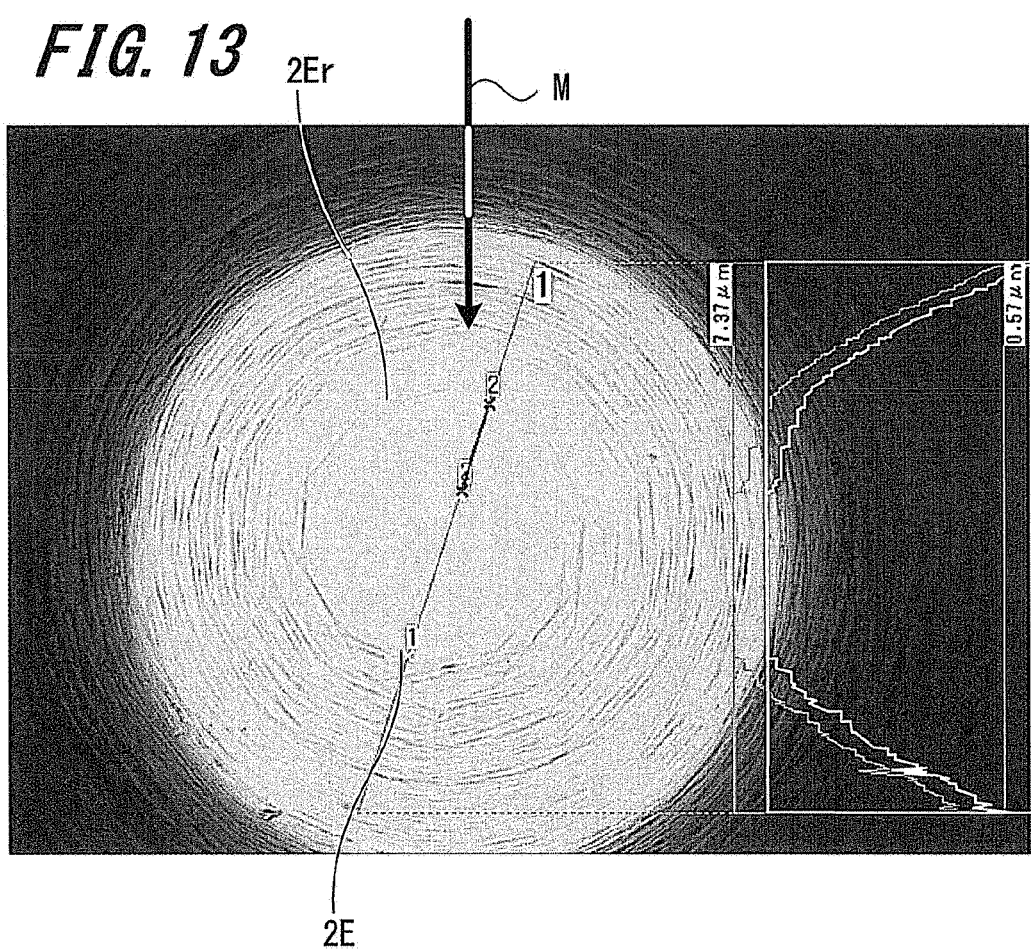
FIG. 13 is a photographic diagram showing a tip part of the SIL according to the embodiment shown in FIG. 12.

FIG. 13 is an enlarged photographic view of the tip part of the SIL 2 where the curved surface 2Er is formed on the edge part. As shown in FIG. 13, the edge part has been formed at the front part of the SIL 2 when the SIL 2 is moved in the direction relative to the data-recording medium 11 coming close to. The curved surface 2Er with a comparatively large curvature as described above may be formed on the area suitably selected from the first half area, a ⅓ or ¼ area, and the like of the edge part including the direction of the data-recording medium 11 coming close to as indicated by the arrow "M". In the example illustrated in FIG. 13, the curved surface 2Er is formed on the first half area of the edge part. In addition, the curved surface may have a large curvature continuously. Alternatively, the curved surface may have a large curvature discontinuously. In other words, part of the curved surface may have a small curvature continuously or discontinuously. In order to efficiently suppress damage to the data-recording medium 11 when the SIL 2 collides therewith, it is preferable that the curved surface with a comparatively large curvature may be formed on a large area and the other area of the edge part may have at least a curved surface.

(3) Third Embodiment

Figure 14:
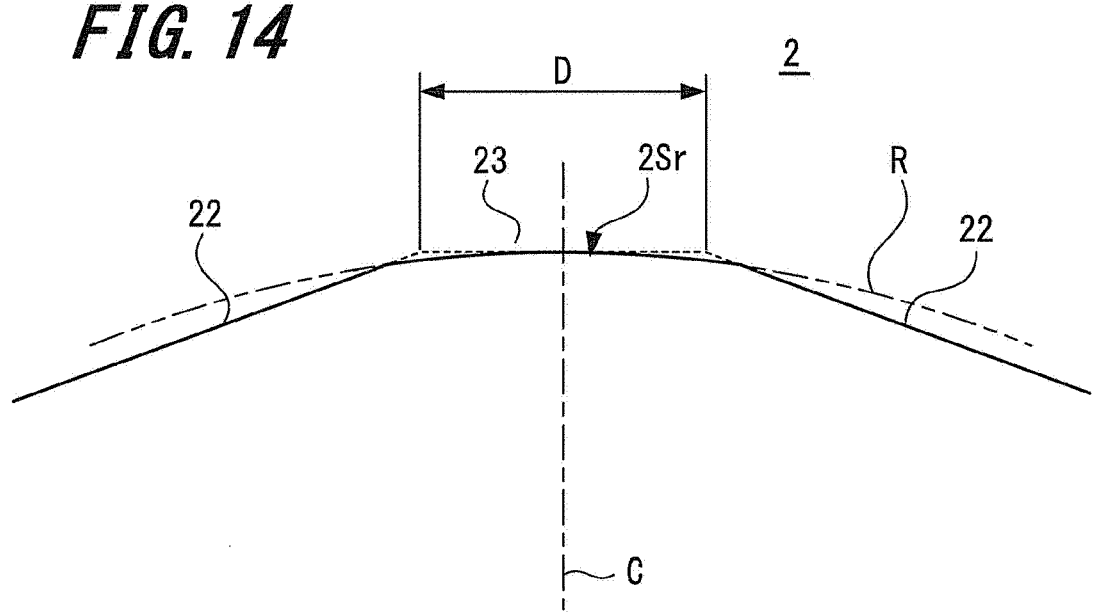
FIG. 14 is an enlarged cross-sectional view of a main part of SIL according to an embodiment of the present invention.

FIG. 14 is an enlarged schematic view of a tip part 23 and a cone-shaped part 22 of a SIL 2 in accordance with a third embodiment of the present invention. In this embodiment, the curved surface formed on the edge part and the tip part 23 form a continuous curved surface 2Sr. Alternatively, the curved surface 2Sr may be part of the spherical surface as represented by the two-dotted line "R". In FIG. 14, the broken line represents the shape of an edge part according to the related art.

Figure 15:
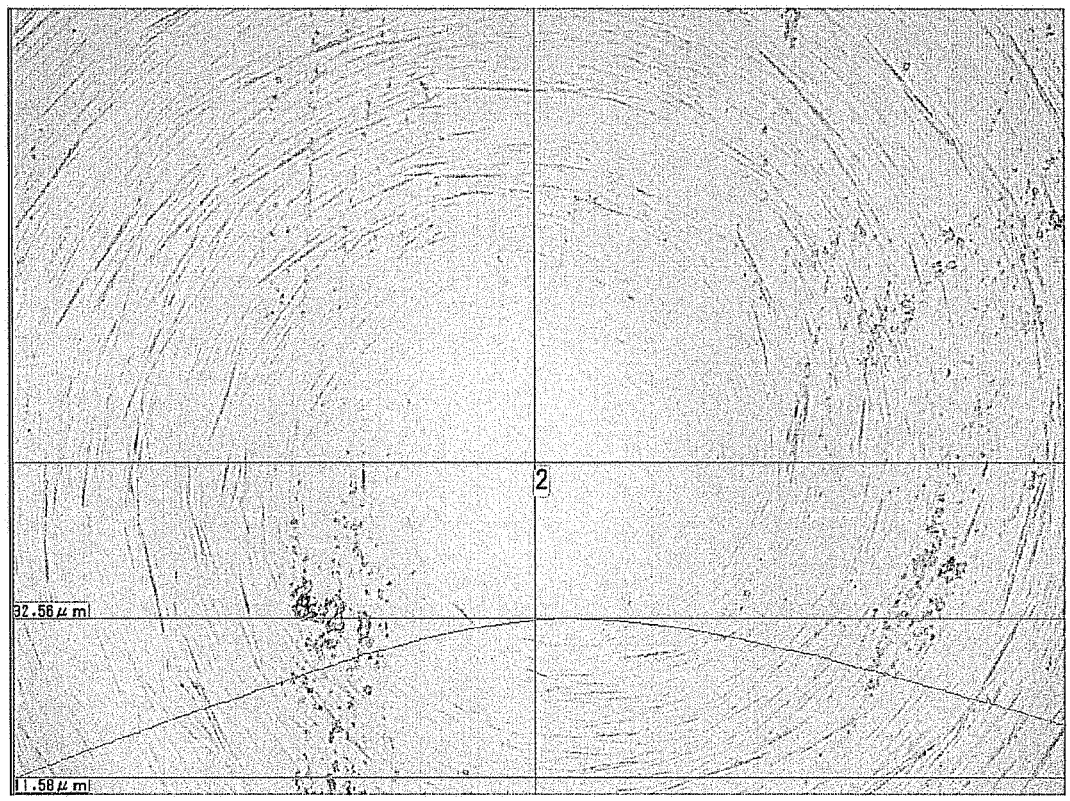
FIG. 15 is a photographic diagram showing a tip part of the SIL according to the embodiment of FIG. 14.

FIG. 15 is an enlarged photographic view of the tip part 23 of the SIL 2 where the curved surface 2Sr, part of the spherical surface, is formed on the tip part 23. Since the curved surface 2Sr is formed continuously including the edge part of the cone-shaped part 22 and the tip part 23, the surface of the data-recording medium 11 can be prevented from receiving a substantial damage due to a collision between the SIL 2 and the data-recording medium 11 similarly to the case according to each of the first and second embodiments.

Each of the SILs in accordance with the respective embodiments as described above has a curved surface on the whole or portion of the edge part between the tip part and the cone-shaped part of the SIL. In other words, cross section of the SIL including the optical axis C has a curved surface 2Er or 2Sr with a certain curvature. The curved surface may have an inflection point in cross section including the optical axis C as represented in FIG. 14. In other words, compared with the comparatively sharp edge part projecting toward the data-recording medium according to the related art represented by the broken line in each of FIGS. 11, 12, and 14, the edge part of any one of the embodiments of the present invention may be dented or ground. In this case, the edge part may not be ground by chamfering, but the curved surface is formed on the edge part to more suitably suppress damage to the data-recording medium.

The use of the SIL formed as described above in an optical pickup device can prevent or suppress damage to the surface of a data-recording medium due to a collision of the SIL with the data-recording medium during the movement (i.e., rotation or the like) of the medium 11 relative to the SIL. In addition, the extent of such damage can be eased even when it occurs. In particular, with the curved surface formed on the whole circumference of the tip part of the SIL, the stress concentration on the edge part can be eased to prevent damage or suppress the extent of damage even if a collision of the SIL with a still data-recording medium (e.g., collision due to an impact from the outside) occurs.

Figure 16A:
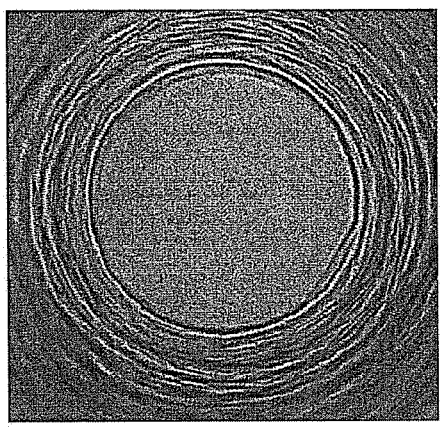
FIGS. 16A to 16C are diagrams illustrating a comparative example, where
Figure 16B:
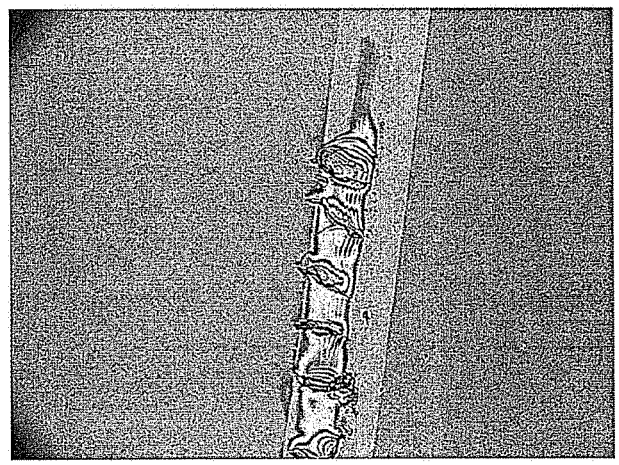
Figure 16C:
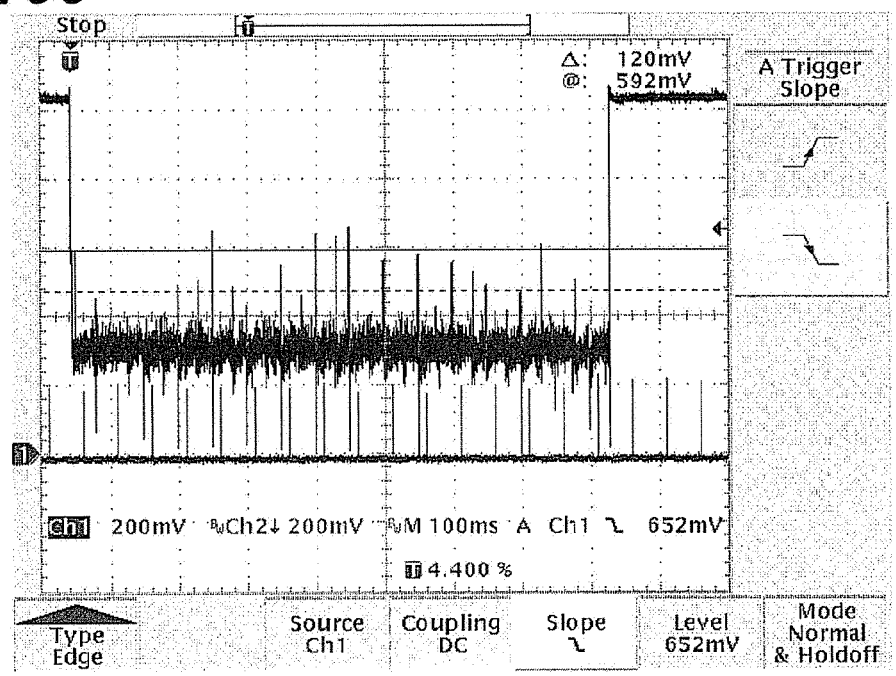
Figure 17A:
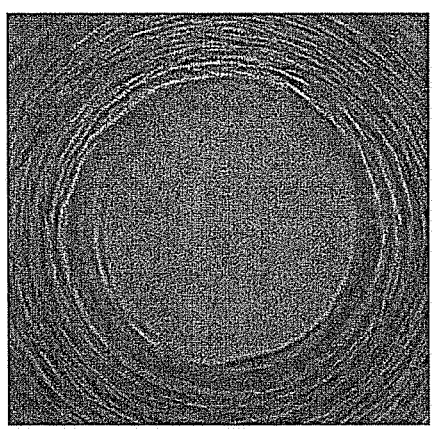
FIGS. 17A to 17C are diagrams illustrating the main part of SIL according to the embodiment of the present invention as shown in FIG. 11, where
Figure 17B:
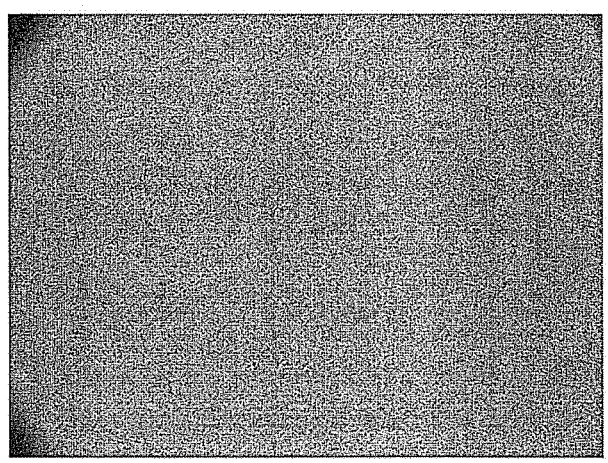
Figure 17C:
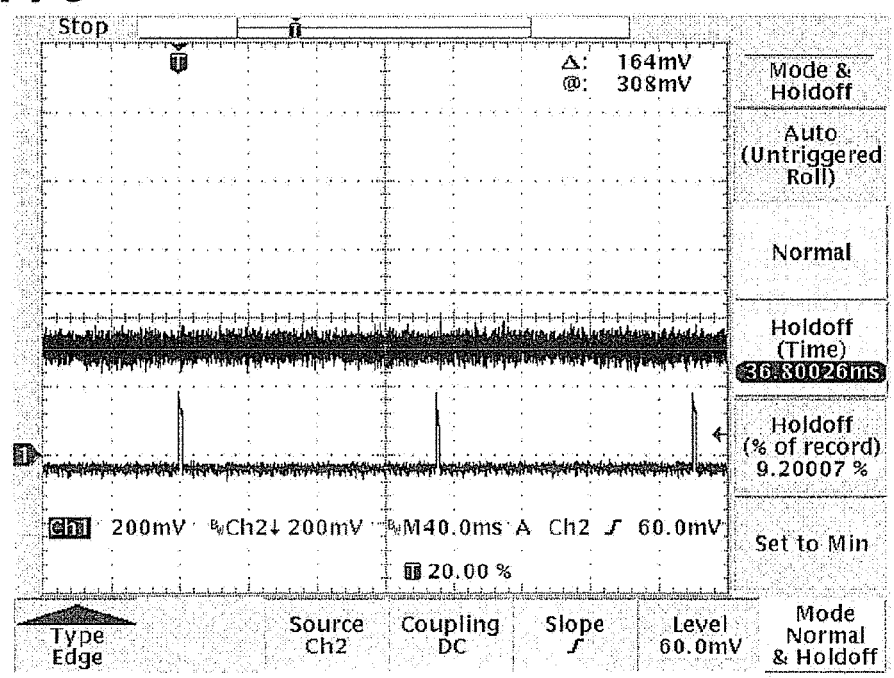

FIGS. 16A to 16C and FIGS. 17A to 17C are diagrams illustrating the difference between a SIL of a comparative example and the SIL of the first embodiment of the present invention, when each colliding with a data-recording medium. FIG. 16A is an enlarged photograph of a tip part of the related-art SIL with the cone-shaped part as illustrated in FIGS. 5A to 5D. FIG. 16B is a photographic view illustrating damage to the data-recording medium. FIG. 16C is a diagram illustrating the output of gap-error signals. FIG. 17A is an enlarged photograph of the tip part of the SIL where the curved surface 2Er is circumferentially formed on the tip part 23 as described in the first embodiment. FIG. 17B is a photograph of the surface of the data-recording medium after the collision. FIG. 17C is a diagram illustrating the output of gap-error signals. In each of FIGS. 16A to 16C and FIGS. 17A to 17C, the cone-shaped part of the SIL has an inclination angle θ of 20 degrees and the tip part has a diameter of 40 μm. The configuration of the data-recording medium used and the condition of collision caused in the comparative example are the same as those in the embodiment. The condition of collision includes a measurement of varied collision speeds. The term "collision speed" describes the speed of the SIL in the direction along the optical axis C at the moment of a collision between the data-recording medium and the SIL at a radial distance of 35 mm from the center of the data-recording medium during the rotation of such a medium at 1200 rpm.

A comparison between FIGS. 16A to 16C and FIGS. 17A to 17C has indicated that the extent of damage to the surface of the data-recording medium varies depending on the shape of the edge part between the tip part and the cone-shaped part of the SIL even under the same collision condition and using the same data-recording medium. In particular, since the curved surface is formed on the edge part in the SIL according to the embodiment of the present invention, the stress concentration at the time of a collision can be eased and damage can be suppressed. In addition, as shown in FIG. 16C, the output of gap-error signals for the related-art SIL changes greatly, causing the gap control to be carried out with difficulty. In contrast, as shown in FIG. 17C, the output of gap-error signals for the SIL according to an embodiment of the present invention may not change greatly, so that the gap control may be carried out. In other words, when using the SIL according to an embodiment of the present invention, stability of the gap control system can be improved.

Figure 18:
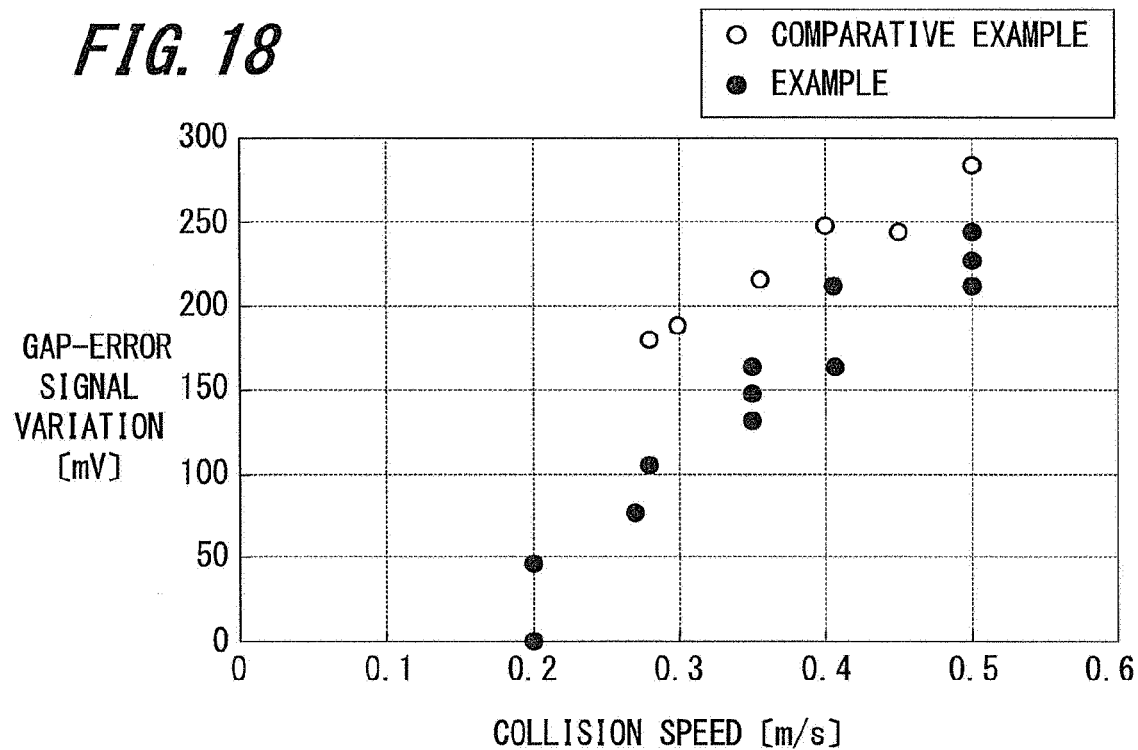
FIG. 18 is a graphic diagram illustrating collision speeds and variations in output of gap-error signals with respect to SIL of a comparative example and SIL according to a first embodiment of the present invention.

FIG. 18 shows the results of collision using a data-recording medium with a hard coat suitable for recording/reproducing with near-field light. The surface of the data-recording medium is coated with a composite layer made of a hard-coating agent or the like containing materials with high refractive indexes, such as fine particles of $CeO_2$ or $TiO_2$. FIG. 18 shows variations in output of gap-error signals when a collision stronger than one under the conditions of FIGS. 16 and 17 is caused by changing the collision speed. In FIG. 18, plotted open circles denote the results of the comparative example shown in FIG. 5 and plotted solid circles denote the results obtained by the use of SIL of the above first embodiment. The horizontal axis indicates a collision speed. The vertical axis indicates variations in output of gap-error signals proportional to the extent of damage to the data-recording medium. As shown in FIG. 18, the use of the SIL according to an embodiment of the present invention reduces the extent of damage as compared with the comparative example when making the comparison with the comparative example at the same collision speed.

Figure 19:
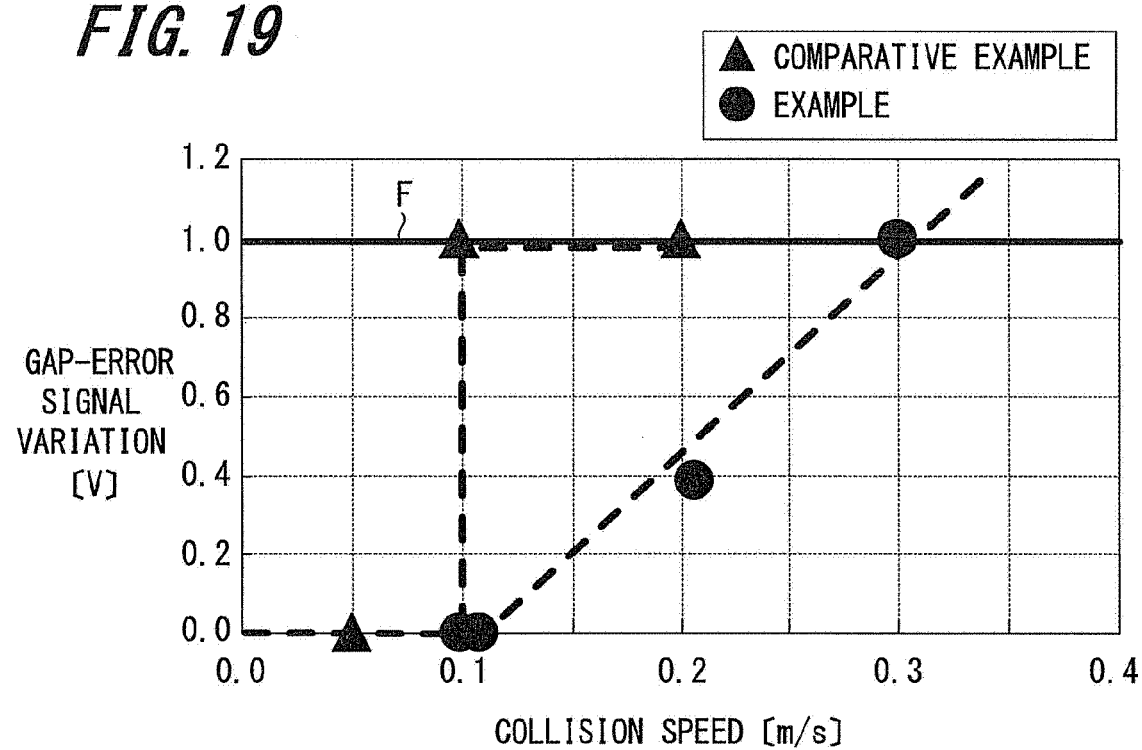
FIG. 19 is a graphic diagram illustrating collision speeds and variations in output of gap-error signals with respect to SIL of a comparative example and SIL according to a first embodiment of the present invention.

FIG. 19 shows the results of collision when using a data-recording medium with a hard coat having surface physical properties different from that of FIG. 18. In the figure, plotted solid triangles indicate the results obtained by the comparative example using the related-art SIL shown in FIG. 5 and plotted solid circles indicate the results obtained by the use of the SIL of the first embodiment. In the comparative example, an output of gap-error signal has a substantial variation at a collision speed of 0.1 m/s and as a result the gap control may become difficult. As a result, the surface of the data-recording medium may be damaged. In contrast, when the SIL according to an embodiment of the present invention is used, gap control can be carried out at a severe collision speed of at least 0.3 m/s and damage to the surface of the data-recording medium can be suppressed.

According to an embodiment of the present invention, since the SIL in which the curved surface is formed on the edge part between the tip part and the cone-shaped part is used, the stress concentration due to a collision of the edge part can be eased even when a collision of the SIL with the data-recording medium has occurred. Therefore, damage to the surface of the data-recording medium can be prevented or suppressed. Further, in addition to the suppression of damage due to collision, it is also possible to stabilize gap control. Therefore, according to an embodiment of the present invention, the stability of the gap-control can be improved in addition to the reduction of collision damage. Consequently, according to an embodiment of the present invention, the stability and reliability of the gap control system can be increased.

Furthermore, the SIL, focusing lens, optical pickup device, and data recording/reproducing apparatus according to an embodiment of the present invention are not limited to those described in the above respective embodiments and can be modified or changed in various ways as long as these modifications or changes are within the scope of the present invention.

It should be understood by those skilled in the art that various modifications, combinations, sub-combinations and alterations may occur depending on design requirements and other factors insofar as they are within the scope of the appended claims or the equivalents thereof.

What is claimed is:

1. A solid immersion lens comprising:
a spherical part;
a cone-shaped part;
a substantially flat tip part; and
an edge part between the cone-shaped part and the substantially flat tip part, wherein the edge part includes a curved surface.

2. The solid immersion lens according to claim 1, wherein a portion of the edge part includes the curved surface.

3. The solid immersion lens according to claim 2, wherein the portion of the edge part that includes the curved surface that has a first curvature larger than a second curvature of a remaining portion of the edge part.

4. A focusing lens, comprising:
a solid immersion lens; and
an optical lens arranged on the opposite side of the solid immersion lens facing an object,
wherein the solid immersion lens includes a spherical part, a cone-shaped part, a substantially flat tip part, and an edge part between the cone-shaped part and the substantially flat tip part, and wherein the edge part includes a curved surface.

5. An optical pickup device, comprising:
a solid immersion lens;
an optical lens arranged on the opposite side of the solid immersion lens facing an object; and
a light source,
wherein the solid immersion lens and the optical lens form at least a part of a focusing lens by which light emitted from the light source is focused to form a light spot, and
wherein the solid immersion lens includes a spherical part, a cone-shaped part, a substantially flat tip part, and an edge part between the cone-shaped part and the substantially flat tip part, and wherein the edge part includes a curved surface.

6. A data recording/reproducing apparatus, comprising:
an optical pickup device including a solid immersion lens, an optical lens arranged on the opposite side of the solid immersion lens facing a data-recording medium, and a light source, wherein the solid immersion lens and the optical lens form at least a portion of a focusing lens by which light emitted from the light source is focused to form a light spot; and
a control device configured to control the focusing lens to move in at least one of a gap direction and a tracking direction of the data-recording medium,
wherein the solid immersion lens includes a spherical part, a cone-shaped part, a substantially flat tip part, and an edge part between the cone-shaped part and the substantially flat tip part, and wherein the edge part includes a curved surface.

* * * * *